J. POTTER.
STABLE RAKE.
APPLICATION FILED APR. 7, 1915.

1,169,284.

Patented Jan. 25, 1916.

Witnesses:
O. C. Lindner
Pearl Stanton

Inventor,
John Potter,
by G. C. Kennedy.
Attorney.

UNITED STATES PATENT OFFICE.

JOHN POTTER, OF WINTHROP, IOWA.

STABLE-RAKE.

1,169,284. Specification of Letters Patent. Patented Jan. 25, 1916.

Application filed April 7, 1915. Serial No. 19,702.

*To all whom it may concern:*

Be it known that I, JOHN POTTER, a citizen of the United States of America, and a resident of Winthrop, Buchanan county, Iowa, have invented certain new and useful Improvements in Stable-Rakes, of which the following is a specification.

Figure 1:
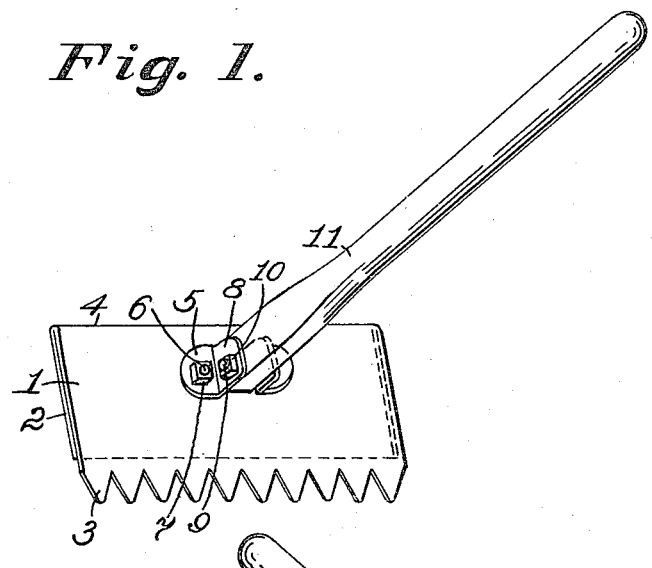
Figure 2:
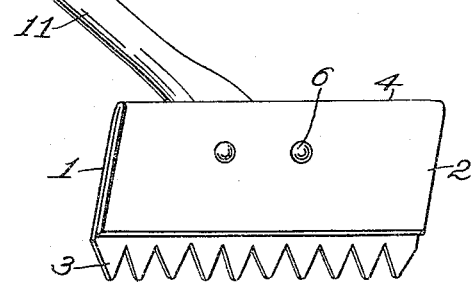

My invention relates to improvements in stable rakes, and the object of my improvement is to supply, particularly for use in stables or the like, a convenient implement for cleaning up litter from stalls or floors, which implement has oppositely located working edges, one edge being smooth, the other dentated. This object I have accomplished by the means which are hereinafter described and claimed, and which are illustrated in the accompanying drawings, in which:

Figure 1 is a perspective view of one side of my improved rake, and Fig. 2 is another perspective view, showing the reverse face of the implement.

Similar numerals of reference denote corresponding parts throughout the several views.

My improved rake is formed of a single rectangular plate, bent near its medial longitudinal line longitudinally to provide a part 2 overlapping and in close contact with an overlapped part 1. The overlapped part 1 being wider than the other part 2, thus has a longitudinal margin extending beyond said other part, said margin having a row of dentations 3, preferably made blunt at their extremities. Since the part 2 is closely folded upon the part 1, the longitudinal edge 4 thus provided for said implement opposite said teeth or dentations 3 is somewhat rounded in cross-section, or convex.

The numeral 5 denotes a pair of angle-plates spaced apart and secured to the outer face of the part 1 by means of the bolts 6 and nuts 7, or by other securing-means. A handle-bar 11 has one end squared and fitted between the outwardly-projecting spaced lugs 8 of said angle-plates, the bar and said lugs being orificed in registration to receive securing-means, consisting of a bolt 9 and nut 10. However, said handle may be otherwise mounted or secured on said plate as desired, and the details generally of said implement may be varied in various particulars, as may be convenient for the purpose, or as desired, without departing from the essential principles of my invention or the scope of its protection.

The dentated edge of the implement is employed for scraping up loose litter, and the implement may be inverted and the smooth edge 4 may be employed to clean up smaller masses or particles which have escaped the rake teeth. This makes the implement especially desirable for use on the floor of a stall or the like.

Having described my invention, what I claim as new, and desire to secure by Letters Patent, is:

A stable rake, comprising a flat plate doubled upon itself to have one longitudinal edge extend marginally beyond the adjacent longitudinal edge of the overlapping part, with the said marginal part longitudinally dentated, and the double parts flattened throughout into complete contact to provide a convex scraping edge opposite to the said dentated edge and a handle fixed angularly to one side of said rake.

Signed at Winthrop, Iowa, this 24th day of March, 1915.

JOHN POTTER.

Witnesses:
A. C. HAYES,
H. M. FITCH.

Copies of this patent may be obtained for five cents each, by addressing the "Commissioner of Patents, Washington, D. C."